United States Patent [19]
Takahashi

[11] 3,869,048
[45] Mar. 4, 1975

[54] APPARATUS FOR HANDLING BAKING PANS
[76] Inventor: Katsushi Takahashi, No. 1021 Miyato, Asaka-shi, Saitama-ken, Japan
[22] Filed: June 30, 1972
[21] Appl. No.: 268,074

[30] Foreign Application Priority Data
July 13, 1971 Japan.................. 46-60847

[52] U.S. Cl............. 214/8.5 A, 214/8.5 K, 221/173
[51] Int. Cl............................................ B65g 59/06
[58] Field of Search .......... 214/8.5 K, 8.5 A, 6 BA; 221/173, 176

[56] References Cited
UNITED STATES PATENTS
3,388,817  6/1968  Johnson......................... 214/8.5 A
3,428,192  2/1969  Witmer............................ 214/8.5 A
3,765,546  10/1973 Westerling.................... 214/8.5 K X FOREIGN PATENTS OR APPLICATIONS
1,268,547  5/1968  Germany ......................... 214/6 N Primary Examiner—Robert J. Spar
Assistant Examiner—George F. Abraham
Attorney, Agent, or Firm—Stevens, Davis, Miller & Mosher

[57] ABSTRACT

Apparatus for separating a lowermost pan out of a large stack of rectangular baking pans piled up with major axis of each pan placed perpendicular to that of next one, disposed in a conveyor line for baking pans, comprising elevator means for lifting a stack of baking pans except for the lowermost pan and a turn table having a pan receiving disc and turning mechanism connected thereto and provided with transfer means for said lowermost pan, thereby enabling the lowermost pan to be transferred to the conveyor line after having been separated from the stack.

2 Claims, 5 Drawing Figures (a)

(b)

3,869,048

APPARATUS FOR HANDLING BAKING PANS

DESCRIPTION OF THE PRIOR ART

In the prior art, each empty baking pan is separated manually out of a stack of many pans, when they are returned to the dough station from the baking oven. A considerable amount of time and labor is consumed, particularly for handling a large stack of baking pans. Some devices have been developed to remedy the situation. However, they are complicated and expensive in construction and susceptible to malfunctions. The present invention has been deviced to overcome disadvantages of the prior art apparatus for handling baking pans.

SUMMARY OF THE INVENTION

The present invention relates to baking pan handling apparatus, more particularly baking pan handling apparatus for separating a lowermost baking pan out of a stack of many baking pans.

It is object of the present invention to provide an apparatus for handling baking pans constructed to separate automatically and continuously a baking pan one after the other out of a large stack of rectangular baking pans piled up with major axis of each pan placed perpendicularly to that of the adjoining pan.

It is another object of the present invention to provide an apparatus for handling baking pans including a turn table mechanism for changing the orientation of a stack of baking pans piled up with a major axis of each pan placed prependicularly to that of adjoing pan so as to enable the lowermost pan to be transferred out of the apparatus in predetermined orientation.

It is further object of the present invention to provide an apparatus for handling baking pans which is compact, relatively simple to construct and not susceptible to malfunction.

According to the present invention, there is provided an apparatus for handling baking pans to separates each baking pan from a stack of rectangular baking pans piled up with a major axis of each pan placed perpendicularly to that of adjoining pan, comprising a turn table mechanism provided with conveyor means and turning device and disposed in a conveyor line for said stack of baking pans, and elevator means located outwardly of said turn table for lifting said stack of baking pans except for a lowermost baking pan which is retained on said turn table.

BRIEF DESCRIPTION OF THE DRAWINGS

Now, one preferable embodiment of the apparatus for handling baking pans according to the present invention will be described in detail by way of example hereinafter with reference to accompanying drawings, in which.

DESCRIPTION OF THE PREFERRED EMBODIMENT

Figure 1:
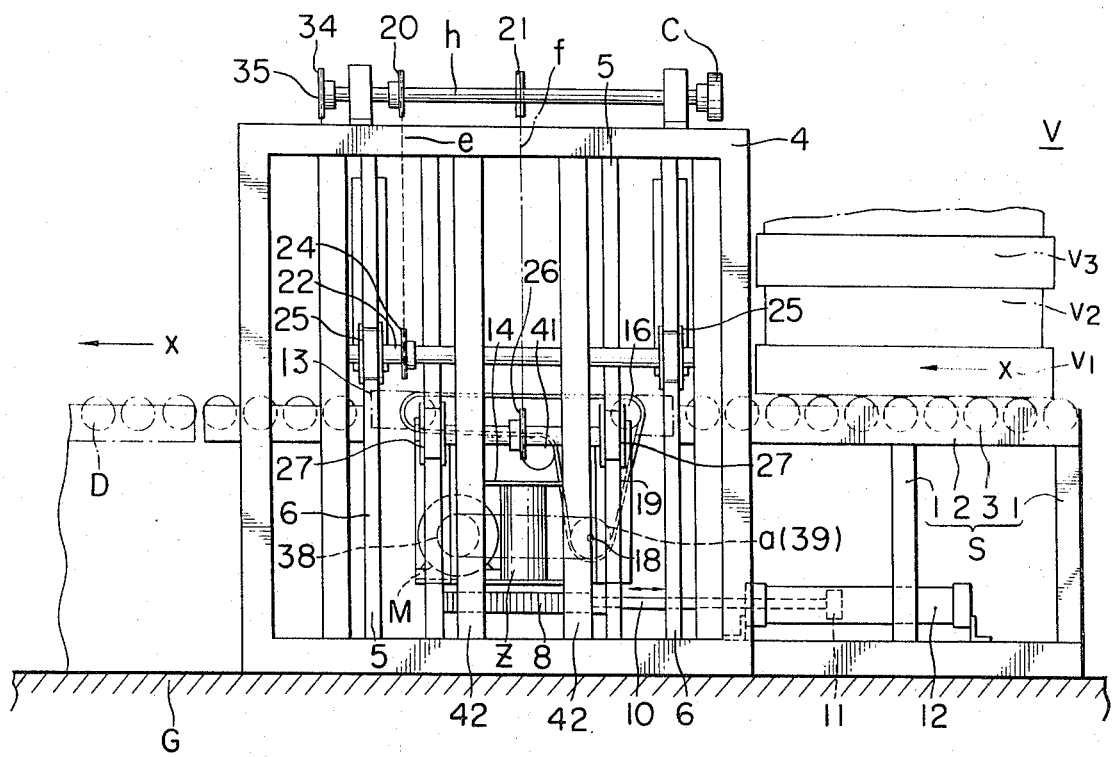
FIG. 1 is a front view showing the apparatus according to the present invention.
Figure 3:
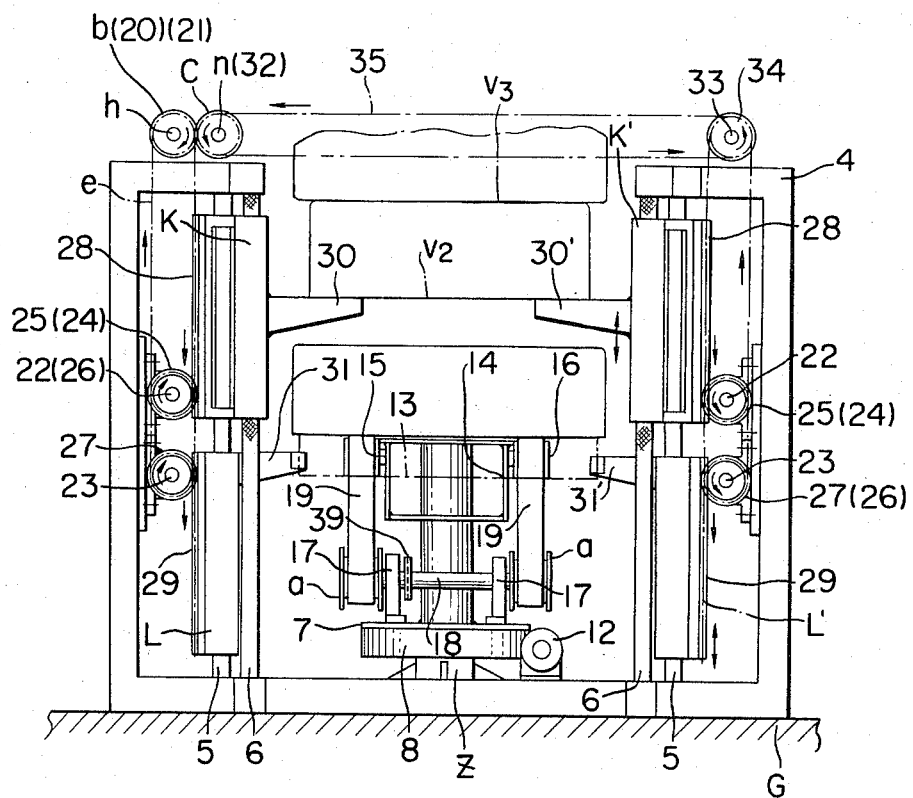
FIG. 3 is a side elevation view showing the apparatus in FIG. 1.

Referring now to FIG. 1, and 3, there is shown a machine frame 4 of the apparatus according to the present invention disposed in a conveyor line for transferring a stack V of rectangular baking pans each of which has its longer dimension at right angles with respect to the longer dimension of the adjacent pan. In FIG. 1, only the conveyor line S connecting to loading side of the apparatus is shown in detail, and compries vertical support members 1 upstanding from the base G, horizontal frame members 2 secured to top ends of the vertical support members 1, and necessary number of rollers 3 rotatably mounted on the frame members 2 at a predetermined spacing and acutated by a suitable power means (not shown), arranged to transfer the stack of backing pans in a direction of arrowhead $x$. Also, a similar conveyor line D is connected to unloading side of the apparatus.

Figure 2:
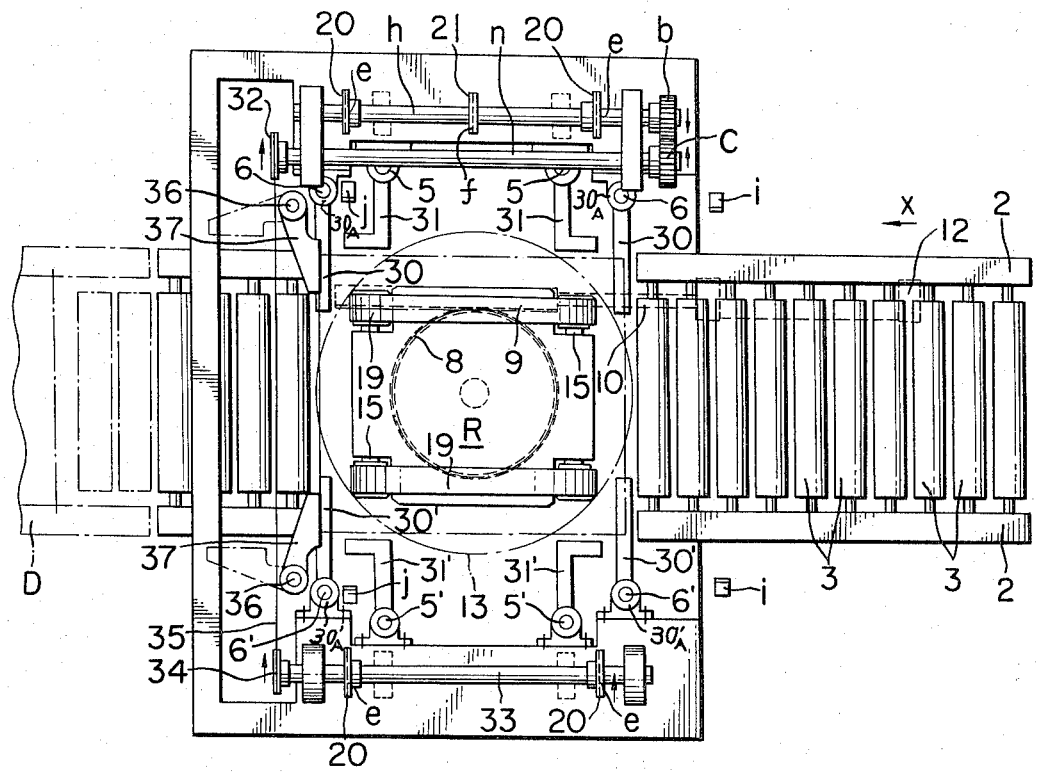
FIG. 2 is a plan view showing the apparatus in FIG. 1.

As shown in FIG. 2, a turn table mechanism R is located in central position of the machine frame 4. A vertical column Z having a pan receiving disc 13 at upper end and a round platform plate 7 at lower end is rotatably mounted on the machine frame 4 (see FIGS. 1 & 3). A toothed wheel 8 is fixedly mounted on the platform plate 7. A rack member 9 in mesh with the toothed wheel 8 is integrally connected to a piston rod 10 at one end of the latter. The piston rod 10 is connected to a piston 11 at the other end, which is slidably mounted within a pneumatic cylinder 12.

As shown in FIGS. 1, 3, a pair of horizontal shaft 15 are mounted on a bracket 14 depending from the pan receiving disc 13. Each horizontal shaft 15 is provided at both ends thereof with rotatable wheels 16. A pair of driving wheels (a) are mounted on a rotating shaft 18 at both ends thereof, which is rotatably supported by a pair of bearings 17. A pair of endless conveyor belts 19 are entrained respectively about each set of rotatable wheels 16 and the driving wheels (a). A guide roller 41 is provided for adjusting a tension of each conveyor belt 19. A pair of elongated slots of suitable size (not shown) are provided on the pan receiving disc 13 so as to have upper run of each conveyor belt 19 exposed through respective slot. Top surface of upper run of each conveyor belt 19 is flush with top surface of the conveyor system S. D. As shown in FIG. 2, two sets of elevator means, that is, first elevator means K, K' and second elevator means L, L' are provided outwardly of the turn table mechanism R for lifting up a stack of baking pans from the pan receiving disc 13 with a lowermost pan retained on the latter. The first elevator K K' is intended for carrying a rectangular baking pan placed with its major axis disposed in the direction of arrowhead $x$, that is, a direction of feed of the stack of baking pans. The second elevator L, L' is intended for receiving a rectangular baking pan placed with its major axis disposed perpendicularly to the direction of arrowhead $x$. The first and second elevator means are constructed to operate alternately.

The first elevator means consists of four hook portion of the pan having its major axis oriented in the direction of arrowhead $x$. Four hook members 30, 30, 30' 30' are fixedly mounted respectively on four sleeve members $30_A$, $30_A$, $30_A'$ $30_A'$ which are in turn sliderably mounted on four guide posts 6, 6, 6' 6' respectively. Sleeve members $30_A$, $30_A$, $30_A'$ $30_A'$ have respectively rack members 28, 28, 28' 28' fixedly mounted thereon. The second elevator means L L' is also constructed in similar manner. As shown in FIG. 2, a pair of rotating shaft $h$, $n$ are rotatably mounted on top of the machine frame 4 in parallel to each other, and have respectively toothed wheel ($b$), ($c$) mounted there on at one end, both of which toothed wheels are meshed with each other. Sprocket wheels 20, 21 are mounted on the rotating shaft $h$. On the other hand, a pair of rotating shafts 22, 23 are rotatably mounted on the machine frame intermediate a height of the same, with the shaft 22 located above the shaft 23. The rotating shaft 22 has a sprocket wheel 24 and pinion 25 fixedly mounted thereon. Similarly, the rotating shaft 23 has a sprocket wheel 26 and pinion 27 fixedly mounted thereon. An endless chain ($e$) is entrained about the sprocket wheel 20 and 24. Similarly, another endless chain ($f$) is entrained about the sprocket wheel 21 and 26. The pinions 25, 27 are in mesh respectively with the rack member 28, 29 as described hereinabove, so as to actuate the elevator means (K, K') and (L, L') along the guide posts (6, 6, 6', 6') and (5, 5, 5', 5').

Figure 4:
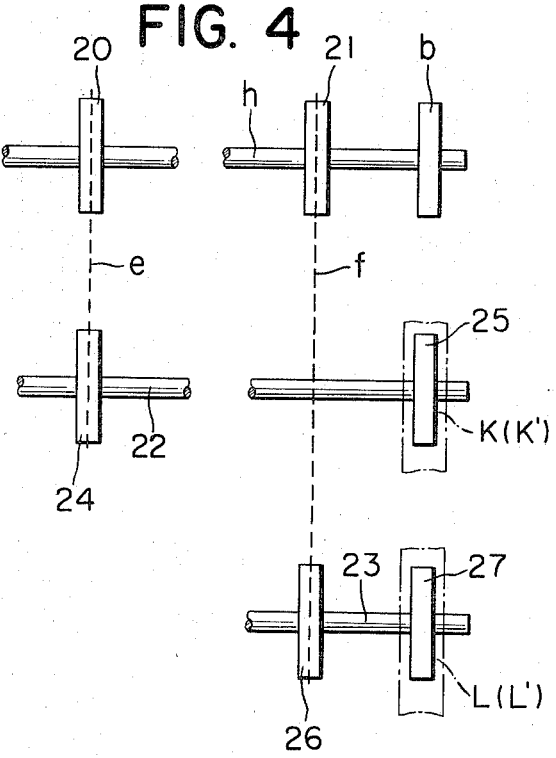
FIG. 4 is a schematic view showing a driving mechanism for elevator means incorporated in the apparatus in FIG. 1, and FIG. 5 (a)(b) are schematic views respectively showing the superposed condition between the lowermost and second from the lowermost pan, and the condition between the second and third from lowermost pan.

As shown in FIG. 2, a sprocket wheel 32 is fixedly mounted on the rotating shaft ($n$) at end one opposite to the end having the toothed wheel ($c$). On the other hand, a sprocket wheel 34 is mounted on a rotating shaft 33 which is rotatably supported on the machine frame 4. An endless chain 35 is entrained about the above-mentioned both sprocket wheels 32 and 34. A power transmission mechanism for driving the pinion 25, 27 as shown in FIG. 4 is also provided on the machine frame 4 in the side wheel the rotating shaft 33 is mounted, so as to enable the elevator means K', L' having respectively hook members 30', 31' to be moved slidably along the guide posts 6', 5'.

The elevator means L, L' and K K' will be operated independently from each other by means of suitable limit switches (not shown).

A pair of stopper members 37, 37 are pivotably mounted on a pair of support shafts 36, 36 respectively adjacent to the platform plate 7 of the turn table mechanism R so as to prevent the stack V of baking pans to be unduly passed away from the pan receiving disc 13.

As shown in FIG. 2, photoelectric means ($i$, $j$) are provided for controlling the operation of limit switches.

Figure 5:
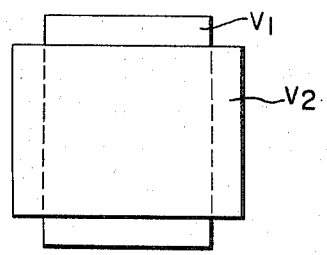
Figure 5:
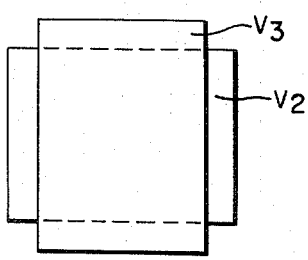

With reference to FIG. 1, a motor M is mounted on the platform plate 7 for driving the conveyor belt 19. A rototable wheel 38 mounted on output shaft of the motor M is operately connected to the driving wheel 39 mounted on the rotating shaft 18 by means of an endless belt or chain member 42 denotes a support member for the machine frame 4. In operation, a stack V of rectangular baking pans piled up with major axis of each pan placed perpendicularly to that of adjoining pan is first feed onto the pan receiving disc 13 of the turn table mechanism R, by means the conveyor system S in the loading side. At this time, the photoelectric system ($j$) will be interrupted, thereby driving the sprocket wheel 34 by suitable power means (not shown). Then, the sprocket 32 will be driven by the endless chain 35. The rotating sprocket 32 will rotate the rotatable shaft 22 through the rotating shaft ($n$), the toothed wheel $c$ and $b$, and the rotatable shaft $h$. Then the elevator means K, K' will be raised by action of the rack 28 in mesh with the pinion 25 which is rotating together with the shaft 22. Therefore, the hook members 30, 30' projecting from the elevator means K, K' will be engaged with the lower surface of the stack V with the lowermost pan $V_1$, remained on the pan receiving disc 13 as shown in FIG. 3, and lift up the whole stack V including the pan $V_2$ which is a second pan, counting from the lowermost pan $V_1$, so as to maintain the stack at a predetermined level. At this time, hook members 31, 31' of the other elevator means are retained in lowermost position. Also, the pair of stopper members 37, 37 will retreat to the phantom line position in FIG. 2 at this time. Then, the motor M on the turn table mechanism R will be energized so as to drive the conveyor belt 19, thereby moving the baking pan $V_2$ away from the pan receiving disc 13 to the conveyor line D in the unloading side. Since the pan receiving disc 13 becomes empty in this manner, the photoelectric system ($j$) will not be interrupted, thereby causing the endless conveyor belt 19 to be stopped. Simultaneously, the toothed wheel 8 will be turned 90° through intervention of piston rod 10 and rack member 9 by action of the pneumatic cylinder 12. On the other hand, both pinions 25, 27 will be rotated in a reverse direction and hence hook members 30, 30' will be lowered together with the elevator means K, K'. Then, the stack V will be brought back onto the pan receiving disc 13 with the pan $V_2$ as shown in FIG. 5 ($a$) located in the lowermost position. At this time, the stopper members 37, 37 are brought back to the solid line position in FIG. 2.

Then, the photoelectric system ($j$) will be interrupted again. However, other limit switch means which are not shown in the drawing will be actuated this time, thereby raising the hook members 31, 31' of the elevator means L, L'. Accordingly, the whole stack V including the pan $V_3$ will be raised up, with the pan $V_2$ as shown in FIG. 5($b$) retained on the pan receiving disc 13, so as to be held at a predetermined level. Since the turn table mechanism R is rotated 90° by action of the pneumatic cylinder 12, the pan $V_2$ remaining on the pan receiving disc 13 will be rotated into the position same as that of the pan $V_2$ shown in FIG. 5 ($a$) which was already moved away. The stopper members 37, 37 will be rotated into phantom line position again. Then, the baking pan $V_2$ will be moved toward the conveyor line D in the unloading side by action of the motor M. Then, since the pan receiving disc 13 becomes empty, the conveyor belt 19 will be stopped. On the other hand, the whole stack V above the pan $V_3$ will be brought back to the disc 13 by downward movement of the elevator means L, L'. Then, the photoelectric means ($j$) will be interrupted again. Thereafter, the limit switch means which are not shown in the drawing will be actuated again, thereby raising the elevator means K, K' again. Hence, the whole stack V will be lifted upwardly, leaving the pan $V_3$ on the pan receiving disc 13, by action of the hook members 30, 30'. On the other hand, since the motor M is energized, the conveyor belt 19 will be actuated, thereby moving the pan $V_3$ toward the conveyor line D in the unloading side. And, in this condition, the pan $V_3$ will be transferred in the same manner as the lowemost pan $V_1$ as shown in FIG. 5 ($a$) was. In this manner, each of the pans will be automatically separated from the stack V one after the other, starting from the lowermost pan $V_1$, by repeating the above-mentioned process. When the photoelectric means ($j$) becomes uninterrupted after all the pan have been separated, another stack V of pans waiting on the conveyor line S for empty into the turn table mechanism R will be transferred to the pan receiving disc 13. Since the pan is removed one after the other from the stack V, starting from the lowermost pan, and transferred to the conveyor line D in the unloading side, the conventional manual handling of the pans requiring a great deal of time and labor will be eliminated, thereby improving the efficiency of operation, saving the operation time, and insuring the pan handling 15 apparatus which is simple and rugged in construction.

In the foregoing descriptions, one type of pan handling apparatus, in which the lowermost pan is retrained on the pan receiving disc and moved away toward the conveyor line in the unloading side, has been described. However, it is possible to bring all the pans positioned as shown in FIG. 5 (b) into a position as shown in FIG. 5 (a) by rotating the disc 90°, and thereafter remove the pan one after the other from the stack starting from the lowermost one by action of the hook members of the elevator means. In this case, only one set of elevator means K, K', or L, L' will suffice.

What is claimed is:

1. An apparatus for handling baking pans to separate each baking pan from a stack of rectangular baking pans piled up with a major axis of each pan placed perpendicularly to that of an adjoining pan, comprising a turn table mechanism provided with a conveyor belt and a pan receiving disc interposed between a loading conveyor line and an unloading conveyor line for said stack of baking pans, vertical guide posts secured to the machine frame at the each corner outside of the said turn table mechanism, the first and second elevator means slidably mounted respectively on said vertical guide posts and horizontal hook members projecting integrally from each of said first and second elevator means, said first and second elevator means being operated independently from each other by means by photoelectric means.

2. An apparatus for handling baking pans to separate each baking pan from a stack of rectangular baking pans piled up with a major axis of each pan placed perpendicularly to that of an adjoining pan, comprising a first pair of rotating shafts rotatably mounted and horizontally spaced apart on the upper surface of a machine frame, a pair of sprocket wheels secured to each rotating shaft, a pair of sprocket wheels rotatably mounted on each of a second pair of shafts respectively mounted beneath the first pair of rotating shafts on an intermediate portion of the machine frame, endless chains entrained between aligned pairs of sprocket wheels mounted respectively upon the upper and intermediate portions of the machine frame, a pair of pinions fixed on each of the shafts of said sprockets mounted on the intermediate portion of the machine frame and elevator means provided with racks each rack engaging a respective pinion, said elevator means lifting said stack of baking pans except for the lowermost baking pan which is retained on a pan receiving disc.

* * * * *